Oct. 5, 1943.  E. R. DUNN  2,331,111
CHUCK
Filed Dec. 8, 1941  2 Sheets-Sheet 1
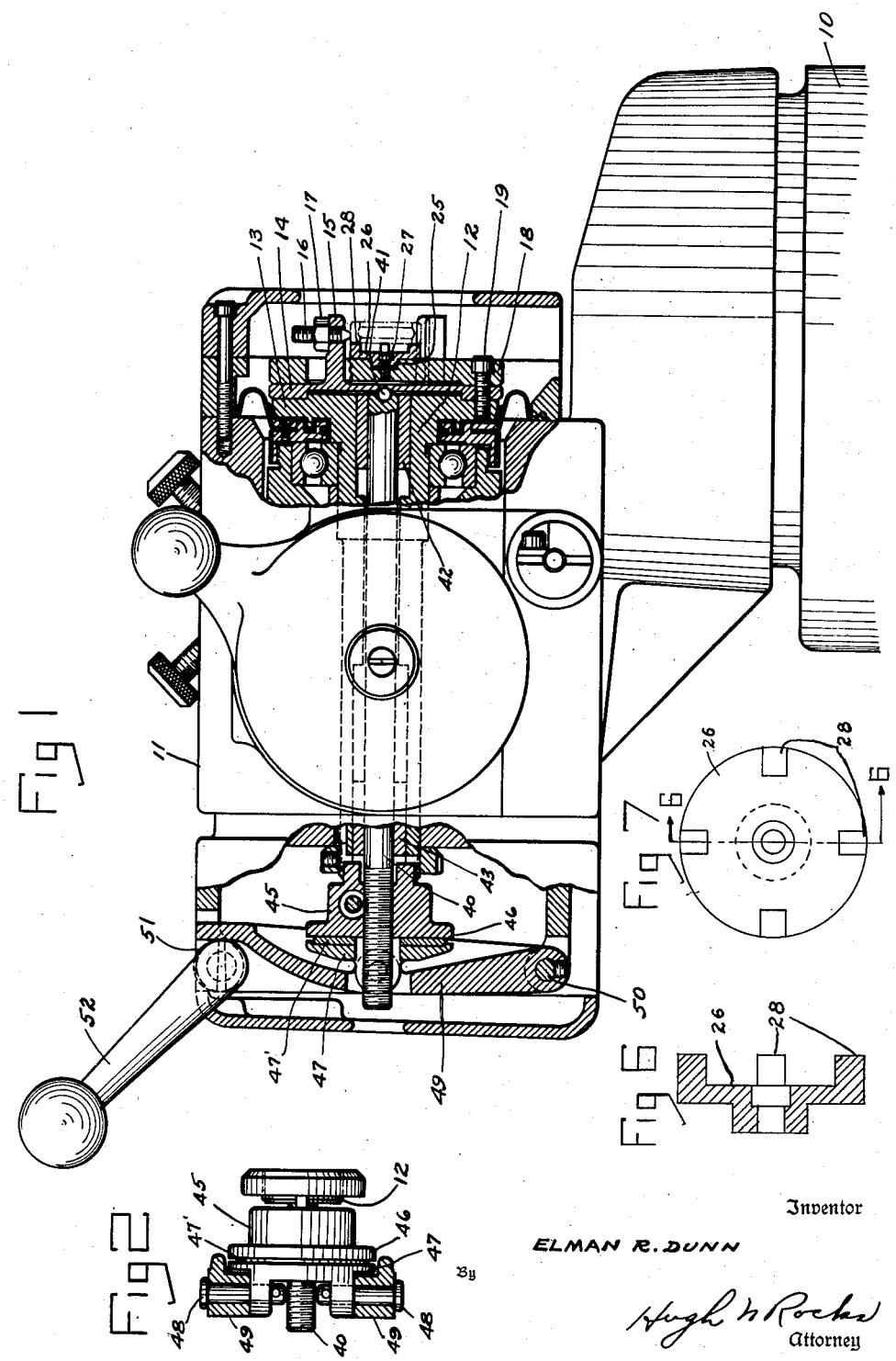
Inventor
ELMAN R. DUNN
By
Hugh N Rocker
Attorney Oct. 5, 1943.   E. R. DUNN   2,331,111
CHUCK
Filed Dec. 8, 1941   2 Sheets-Sheet 2
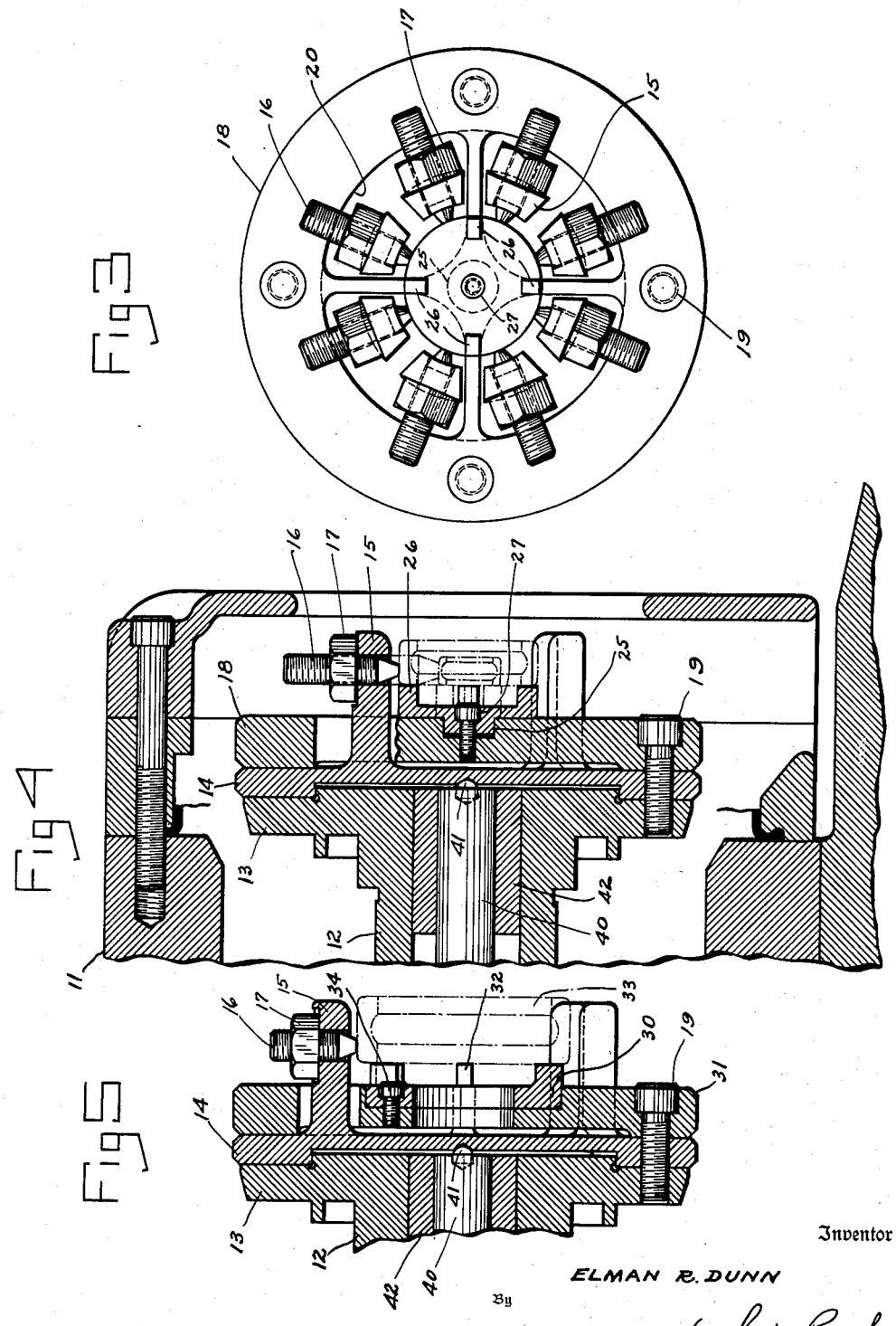
Inventor
ELMAN R. DUNN
By
Hugh N Rocks,
Attorney Patented Oct. 5, 1943

2,331,111

UNITED STATES PATENT OFFICE 2,331,111

CHUCK

Elman R. Dunn, Waynesboro, Pa., assignor to Landis Tool Company, Waynesboro, Pa.

Application December 8, 1941, Serial No. 422,171

4 Claims. (Cl. 279—46)

My invention relates to chucks, particularly of the type having jaws mounted on a flexible diaphragm.

An object of my invention is to provide a means for locating a work piece axially in a chuck.

A further object is to provide a work stop consisting of a single member.

A further object is to provide a work stop which may be removed and replaced by another without affecting the set-up of the chuck.

Figure 1 is a front elevation of a headstock for a ball race grinding machine partly broken away to show the method of mounting and operating the chuck.

Figure 2 is a plan view of a part of the chuck operating mechanism.

Figure 3 is an end elevation of my invention.

Figure 4 is a sectional front elevation showing the method of mounting a small stop.

Figure 5 is a sectional front elevation showing a similar method of mounting a larger stop.

Figure 6 is a sectional end view of the removable stop member.

Figure 7 is a front elevation of said stop member.

In the drawings, numeral 10 indicates the base of a machine, in this case a ball race grinder, 11 a headstock mounted thereon, and 12 a hollow spindle rotatably mounted in said headstock. On the right hand end of said spindle is a flange 13 to which is attached a flexible disk 14. Said disk has a series of lugs 15 projecting laterally from an intermediate circumference thereof. Radially adjustable gripping members 16 are mounted in each of said lugs. Each of said members may be locked in adjusted position by means of lock nuts 17.

A plate 18 is mounted next to said disk and both members are secured to flange 13 by means of screws 19. Said plate has openings 20 thru which lugs 15 may extend. The center of said plate is bored to receive the pilot 25 of a stop member 26. Said stop member has a series of locating surfaces 28 which are held to a minimum both as to number and as to area so as to lessen the chance of dirt lodging thereon. Said stop is further secured to said plate by means of a screw 27. As shown by the rot and dash lines in Figure 4, stop member 26 may be replaced by another of a different size to accommodate work of different diameters. Practice is to supply three stop members with each chuck.

In Figure 5 is shown a chuck for use with larger races. The principal difference between this and the smaller chuck other than size is in the stop member 30 and the plate 31 for supporting same. Said stop member is a ring having a series of lugs 32 forming seats against which the work 33 may be located. Said stop is mounted in a recess in plate 31 and secured to said plate by means of screws 34.

The means for actuating said chuck consists of a rod 40 passing thru said hollow spindle and having a steel ball 41 inserted in one end thereof for engaging the disk 14. Said rod is supported on bushings 42 and 43 in said spindle. A collar 45 is clamped to said rod near the other end. Said collar has a flange portion 46 the face of which is engaged by a friction disk 47' on brake member 47. Member 47 is pivotally supported on pins 48 in arm 49. Said lever is pivoted at 50. A cam 51 actuated by operating lever 52 engages the free end of arm 49.

The spindle 12 may be driven by any suitable means, in this case thru a V belt from a motor in the bed of the machine (not shown).

The chuck may be opened by shifting lever 52 to the right, thus urging rod 40 and ball 41 against disk 14. Pressure of rod 40 causes disk 14 to flex so that lugs 15 move radially outward and release a work piece held thereby. At the same time brake disk 47 urges friction disk 47' against the flange 46 to stop rotation of the spindle.

A work piece is placed in the opened lugs or jaws 15 and located axially against the work locating member 26. Said work piece should be turned slightly to dislodge any particles of grit which might have settled on the locating surfaces of said work locating member. The lever 52 is released and the jaws 15 close to grip the work. At the same time the brake members 47 and 46 are separated so that the spindle is free to rotate.

I claim:

1. In a machine tool, a headstock, a spindle rotatably mounted therein, a chuck comprising a diaphragm, chuck jaws on said diaphragm, means for flexing said diaphragm to move said chuck jaws, a plate having openings thru which said jaws may extend, means for locating a work piece axially in said jaws including a stop member removably secured to the center of said plate, and a plurality of work locating surfaces on said stop member.

2. In a machine tool, a headstock, a spindle rotatably mounted therein, a chuck comprising a diaphragm, chuck jaws on said diaphragm, means for flexing said diaphragm to move said chuck jaws, a plate having openings thru which said jaws may extend, another opening in the center of said plate, and a work locating membed adapted to be inserted in said center opening.

3. In a machine tool, a headstock, a spindle rotatably mounted therein, a chuck comprising a diaphragm, chuck jaws on said diaphragm, means for holding said diaphragm on said spindle including a plate having openings through which said jaws may extend, means for flexing said diaphragm to move said chuck jaws, and means for attaching any one of a plurality of work locating members of different sizes to said plate between the jaws.

4. In a machine tool, a headstock, a spindle rotatably mounted therein, a chuck comprising a diaphragm, chuck jaws on said diaphragm, means for holding said diaphragm on said spindle including a plate having openings through which said jaws may extend, a work locating member, and means for attaching same to the center portion of said plate.

ELMAN R. DUNN.